United States Patent
Smith, III et al.

(10) Patent No.: US 12,368,572 B2
(45) Date of Patent: Jul. 22, 2025

(54) METHOD AND APPARATUS FOR PROTECTING NUMBERS AND STRINGS USING FORMAT-PRESERVING ENCRYPTION WITH AUTOMATIC PRECISION

(71) Applicant: MICRO FOCUS LLC, Santa Clara, CA (US)

(72) Inventors: Phillip Hillyer Smith, III, Santa Clara, CA (US); Leslie Clayton Gutschow, Santa Clara, CA (US); Richard Todd Minner, Santa Clara, CA (US); Thomas J Wu, Santa Clara, CA (US)

(73) Assignee: Micro Focus LLC, Santa Clara, CA (US)

( * ) Notice: Subject to any disclaimer, the term of this patent is extended or adjusted under 35 U.S.C. 154(b) by 329 days.

(21) Appl. No.: 17/478,637

(22) Filed: Sep. 17, 2021

(65) Prior Publication Data
US 2023/0089724 A1    Mar. 23, 2023

(51) Int. Cl.
*G06F 21/60* (2013.01)
*H04L 9/06* (2006.01)

(52) U.S. Cl.
CPC .......... *H04L 9/0618* (2013.01); *G06F 21/602* (2013.01)

(58) Field of Classification Search
CPC ... H04L 9/0618; H04L 9/0894; G06F 21/602; G06F 21/6254
See application file for complete search history.

(56) References Cited

U.S. PATENT DOCUMENTS

| | | | |
|---|---|---|---|
| 7,685,214 B2 | 3/2010 | Chen et al. | |
| 10,007,910 B2 | 6/2018 | von Mueller et al. | |
| 10,430,433 B2 | 10/2019 | Stearn et al. | |
| 10,749,674 B2 | 8/2020 | Roake et al. | |
| 2010/0268692 A1* | 10/2010 | Resch ................ | G06F 16/1748 707/687 |
| 2012/0039469 A1* | 2/2012 | Mueller ............. | G06Q 20/3823 380/252 |

(Continued)

OTHER PUBLICATIONS

Li et al. "Format-Preserving Encryption for Character Data," Journal of Networks, Aug. 2012, vol. 7, No. 8, pp. 1239-1244.

*Primary Examiner* — Ali S Abyaneh
(74) *Attorney, Agent, or Firm* — Sheridan Ross P.C.

(57) ABSTRACT

Techniques for Precision-Preserving Format-Preserving Encryption (PPFPE) to protect numeric values and strings with leading/trailing and special characters, while preserving their precision, both as a protected value (e.g., ciphertext) and when decrypted are provided. In one aspect, a plaintext string is parsed to detect a first and last sentinel characters, wherein any character(s) preceding the first sentinel character comprises a leading character(s) and any character(s) following the last sentinel character comprises a trailing character(s). Any leading character(s) preceding the first sentinel character and/or any trailing character(s) following the last sentinel character are passed through. A ciphertext string is generated by encrypting the first and last sentinel character using one or more subsets of a set of encryption characters; and encrypting the portion of the plaintext string between the first and last sentinel character using the set of encryption characters.

20 Claims, 14 Drawing Sheets

(56) References Cited

U.S. PATENT DOCUMENTS

| | | | |
|---|---|---|---|
| 2013/0091028 A1* | 4/2013 | Oder, II et al. | G06Q 20/3278 |
| | | | 705/16 |
| 2013/0168450 A1 | 7/2013 | von Mueller et al. | |
| 2013/0212026 A1* | 8/2013 | Powell | H04L 9/0894 |
| | | | 705/76 |
| 2017/0048059 A1* | 2/2017 | Murray | H04L 9/065 |
| 2017/0104723 A1* | 4/2017 | Merritt | H04L 63/0281 |
| 2018/0337768 A1 | 11/2018 | Minner et al. | |
| 2019/0103965 A1* | 4/2019 | Roake | H04L 9/14 |
| 2020/0396056 A1* | 12/2020 | Boesgaard | H04L 9/0618 |
| 2021/0049935 A1 | 2/2021 | Balabine et al. | |

* cited by examiner

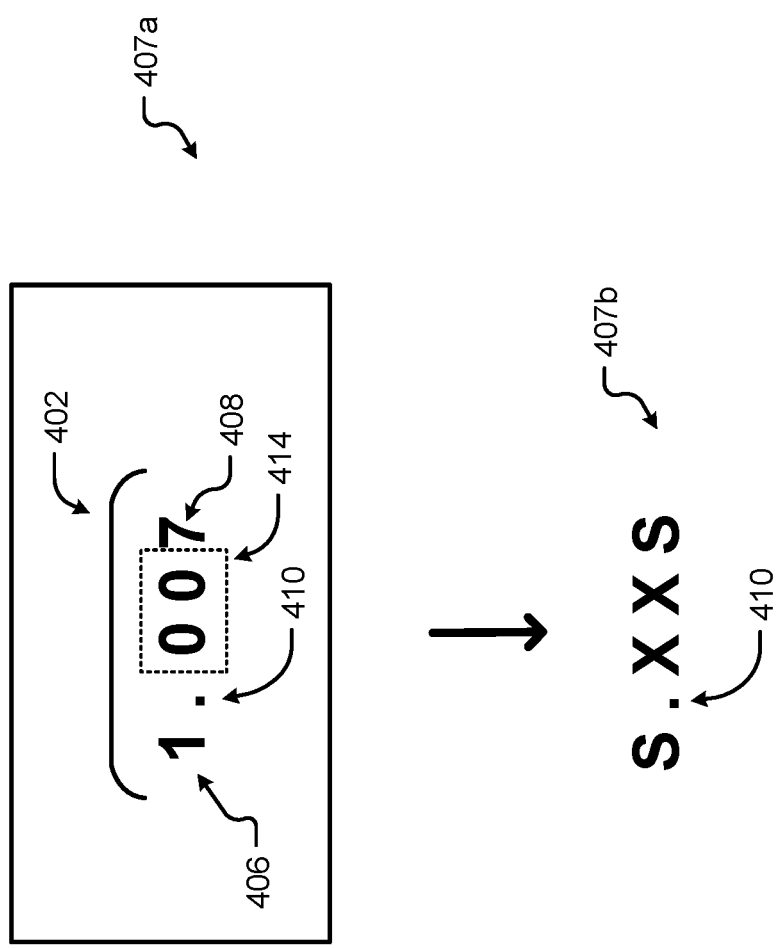

METHOD AND APPARATUS FOR PROTECTING NUMBERS AND STRINGS USING FORMAT-PRESERVING ENCRYPTION WITH AUTOMATIC PRECISION

FIELD

The disclosure relates generally to Precision-Preserving Format-Preserving Encryption (PPFPE), and particularly to a method of using PPFPE to protect numeric values and strings with leading/trailing and special characters, while preserving their precision, both as a protected value (e.g., ciphertext) and when decrypted.

BACKGROUND

Format-Preserving Encryption (FPE) is a type of encryption in which the ciphertext (i.e., the encrypted content) is in the same format as the plaintext (i.e., the unencrypted content). The term Format-Preserving may be easier to understand by way of example. For example, the plaintext of a credit card number may consist of 16 numeric digits. Utilizing FPE, the resulting ciphertext also contains 16 numeric digits, but those digits would be different than the original plaintext. As another example, a database may include a person's name. The plaintext would be a given number of alphabetic characters (e.g., "Smith"). The FPE ciphertext would consist of the same number of alphabetic characters (e.g., "kQnaI"). Again, the actual characters of the ciphertext would be different than the plaintext. Protecting numeric values using FPE turns out to be surprisingly complex for cases where the precision of the value is significant. For example, the plaintext to be encrypted may include special characters, such as, but not limited to spaces, leading/trailing zeros, decimal points, etc.

SUMMARY

These and other needs are addressed by the various embodiments and configurations of the present disclosure. The present disclosure can provide a number of advantages depending on the particular configuration. These and other advantages will be apparent from the disclosure contained herein.

Techniques for Precision-Preserving Format-Preserving Encryption (PPFPE) are provided. In one aspect, a plaintext string is parsed to detect a first and last sentinel character, wherein a character(s) preceding the first sentinel character comprises a leading character and a character(s) following the last sentinel character comprises a trailing character. Any leading character(s) preceding the first sentinel character and/or any trailing character(s) following the last sentinel character are passed through.

A ciphertext string is generated by encrypting the first and last sentinel characters using one or more subsets of a set of encryption characters; and encrypting the portion of the plaintext string between the first and last sentinel characters using the set of encryption characters. The subset of the set of encryption characters for encrypting the first sentinel character may be the same or different from the subset of the set of encryption characters for encrypting the last sentinel character. That is to say, there may be one or multiple subsets of the set of encryption characters.

The phrases "at least one", "one or more," "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIGS. 4A-4I depict examples of plaintext strings and their associated ciphertext strings according to techniques described herein.

DETAILED DESCRIPTION

Figure 1:
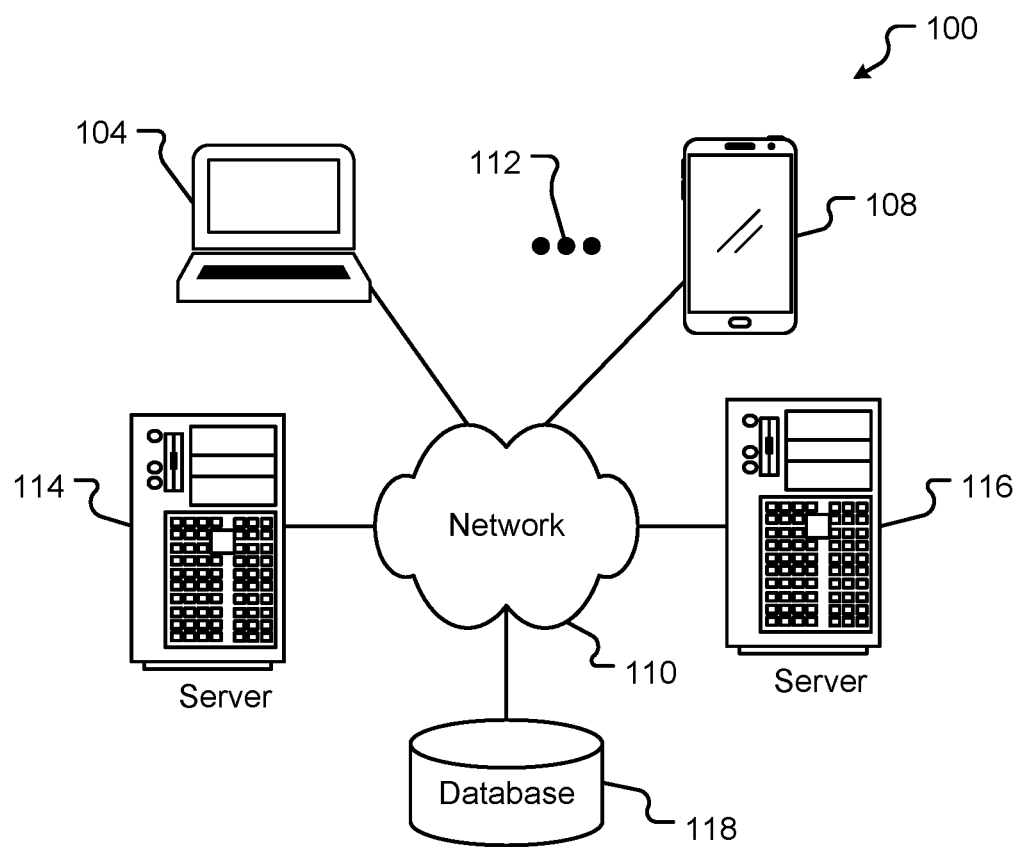
FIG. 1 is a block diagram illustrating elements of an example computing environment in which embodiments of the present disclosure may be implemented.

Format-Preserving Encryption (FPE) is sometimes used when retrofitting systems that were not originally designed to utilize encryption. For example, consider a database that stores credit card numbers as a numeric field. In other words, the field can only store the digits 0-9. Any type of encryption that does not result in ciphertext containing only digits would not be usable with a field that was so defined. Similarly, a field may be defined as only storing alphabetic characters (e.g., the letters A-Z). Such a field may, for example, be used to store data such as a person's name. Again, any type of encryption that does not result in ciphertext containing only alphabetic characters would not be usable for an alphabetic field. Using FPE ensures that the ciphertext that is generated is in the same format as the plaintext, and as such is capable of being stored.

FPE is not without shortcomings. Because the format of the ciphertext follows the format of the plaintext, certain information about the plaintext may be discernible. For example, consider a database that stores credit card numbers. If the plaintext is a 16-digit number representing a credit card number, the ciphertext will also be a sixteen-digit number. If an unscrupulous actor were able to gain access to the complete database, he might be able to see that each record in the database contains a field with 16 digits. From this information, the bad actor may be able to infer that because credit card numbers are typically 16 digits, that particular field in the database contains credit card numbers. From there, the attacker could focus on attempting to break the encryption on that particular field, instead of having to break the encryption on the entire record.

As yet another example, consider the case of a database that contains records that include a field for a person's last name. When utilizing FPE, the length of the ciphertext would be the same as the length of the plaintext. For the majority of names, there would be no issue, as the length of the encrypted name generally reveals nothing as there would likely be many other names of the same length. However, at the edge cases, the length of the encrypted names could potentially reveal the unencrypted names. For example, consider extremely short last names, such as the name Wu. Here, the encrypted name would still be only 2 characters long. Consider a database that only contains one person with a 2-character last name. It is clear that this record would belong to the person whose last name is Wu because no other person's encrypted name could generate a 2-character ciphertext.

Typically, numbers are protected either as: (1) a range: input must be between x and y, and output will be in the same x-y range (or another range of the same size); (2) a string: input must be digits, and output will be the same number of digits. These both have their advantages. Ranges allow tight control of the range of the protected data, for cases where that is important (e.g., when protecting geographic coordinates, latitude/longitude values must not exceed 90 and 180, respectively). However, such protection is not truly format-preserving in that an input of 1 might protect to 180 and vice-versa, and any precision is lost in the protected value. Leading and trailing zeroes on the original plaintext are also lost, as there is no way for the decryption process to know that the input was actually 00180 rather than 180.

Protecting numbers as strings preserves length, but can produce leading zeroes: 180 might protect to 001. This is not necessarily a problem if the data is stored in character format, but if data transitions to a numeric format at any point (e.g., 001→1), then when the data is returned to character form, the leading zeroes must be restored. As "1" is going to decrypt to another single digit, not to three digits "180". As with range encryption, there is no way for the decryption process to know what that original precision was.

There are also cases, such as account numbers, where the number of significant digits is itself meaningful. Thus, a column might contain values:

0000012345
0098765432

The fact that the first value has five significant digits indicates the type of account, which is different from the eight-significant-digit second value. Neither protection type—numeric or string—solves this use case since either might introduce leading zeroes on the protected value.

For example, without Precision-Preserving Format-Preserving Encryption (PPFPE):

0000012345→0000009876 resulting ciphertext string has four non-zero digits

0098765432→0000012345 resulting ciphertext string has five leading zeros

0000012345→0005697126 resulting ciphertext string has seven non-zero digits

A common, partial solution is to use a string encryption using an alphabet of 1-9. This preserves the precision, but with unacceptable leakage of zeroes in the value since the zeros are never protected. For example, for the plaintext input "00010200" only the "1" and "2" will be protected. In contrast, with the disclosed invention the significant portion "10200" is protected.

Before continuing with the description, we define the following terms and symbols:

A sentinel character (S) is a character that demarcates a portion of the plaintext, and is protected in such a way that it can again be recognized as a sentinel in the resulting ciphertext for decryption. In the case of plaintext comprising digits, a character is a first sentinel character if it is the first non-zero digit, possibly only if it precedes a special character (e.g., a decimal point). For example, in the plaintext string "003.14" the "3" is the first sentinel character. The first sentinel character may also be referred to as a leading sentinel character.

Similarly, a character may be a last sentinel character if it is the last non-zero digit, possibly only if it follows a special character (e.g., a decimal point). For example, in the plaintext string "1.560" the "6" is the last sentinel character. The last sentinel character may also be referred to as a trailing sentinel character.

A special character (e.g., a decimal point) may itself act as first or last sentinel character if there is no such non-zero sentinel digit (e.g., in the plaintext string "0.012300" the decimal point is the first sentinel character (and special character). These techniques are described in further detail below and in conjunction with the appended figures.

S=sentinel character(s) are encrypted using one or more subsets of a set of encryption characters. For example, if the plaintext input comprises digits with leading zeros, the sentinel characters may be encrypted using the subset 1-9 (zero excluded).

X=plaintext character(s) may be encrypted with the full set of encryption characters. In the case of the plaintext string comprising digits, as discussed above, the full set of encryption characters will be 0-9.

Thus input 00012300 will protect to 000SXXXX, where S is the first sentinel character encrypted using a subset (1-9, excluding zero) of the set of encryption characters, and X is encrypted using the full set of encryption characters (any digit, including zero).

Floating-point values (non-integers) may also be handled by this scheme in a related way. Trailing zeroes following the last sentinel character after a decimal point are also ignored, and the same protection is then applied. Thus, the plaintext input "00123.450" will protect to 00sxx.xs0, with a domain of $81*10^3$ (rather than $10^5$ as the domain would be if the five digits protected were protected with the full 0-9 alphabet).

Note that "trailing" zeros before and "leading" zeroes after a decimal point may be considered significant and encrypted rather than passed through. For example: 0.01230 might protect to "0.76540" (e.g., the "0" after the decimal encrypted to "7", a non-zero). This is safe because any decryption process already has to know where to place the decimal point, so it will not lose such zeroes; the decimal itself acts as a first sentinel.

True zero values of any sort—0, 0.00, 0000, etc.—are passed through unchanged, as they are "net empty" meaning there is no actual data to protect.

The scheme may be generalized to apply to non-numeric plaintext where only a portion is considered significant. For example, leading and trailing spaces in a text string are often added or removed freely, and so present problems similar to zeroes in a numeric FPE ciphertext. Using the scheme, a plaintext name string such as "_ _Tom Wu_ _" (where underscore "_" represents a space) might encrypt to "_ _x_Ab_D_ _", wherein: the two leading and two trailing spaces are passed through unchanged; the T and u act as first and last sentinel and are never encrypted to a space; and the interior portion "om W" may be encrypted freely using all characters, including spaces. In this example, T encrypts to x, o encrypts to _ (space), m encrypts to A, interior space encrypts to b, W encrypts to _ (space), and u encrypts to D.

As with any encryption scheme, a fundamental aspect is reversibility: each step of the encryption process must be deterministically reversible, such that from any ciphertext produced the original plaintext may be recovered by reversing the steps. The present disclosure allows for certain insignificant modification to a ciphertext (specifically, the addition or removal of certain leading and trailing characters) while ensuring that the significant portion of the original plaintext may still be recovered.

Any otherwise acceptable Format-Preserving Encryption algorithm is usable for this invention, including NIST FF1 and FF3-1.

Various embodiments and aspects of the embodiments are disclosed, including:

In one embodiment, a method is disclosed. The method for performing Precision-Preserving Format-Preserving Encryption (PPFPE), the method comprising:
  parsing a plaintext string undergoing the PPFPE starting from a beginning to an end to detect a first sentinel character, wherein a character(s) preceding the first sentinel character comprises a leading character(s);
  parsing the plaintext string undergoing the PPFPE starting from the end to the beginning to detect a last sentinel character wherein a character(s) following the last sentinel character comprises a trailing character(s);
  passing through the leading character(s) preceding the first sentinel character;
  generating a ciphertext string by:
    encrypting the first and last sentinel characters using one or more subsets of a set of encryption characters; and
    encrypting a portion of the plaintext string between the first and last sentinel characters using the set of encryption characters; and
  passing through the trailing character(s) following the last sentinel character.

In another embodiment, a non-transitory, computer-readable medium comprising a set of instructions stored therein which, when executed by a processor, cause the processor to:
  parse a plaintext string undergoing Precision-Preserving Format-Preserving Encryption (PPFPE) starting from a beginning to an end to detect a first sentinel character, wherein a character(s) preceding the first sentinel character comprises a leading character(s);
  parse the plaintext string undergoing the PPFPE starting from the end to the beginning to detect a last sentinel character wherein a character(s) following the last sentinel character comprises a trailing character(s);

pass through the leading character(s) preceding the first sentinel character;
generate a ciphertext string by:
encrypting the first and last sentinel characters using one or more subsets of a set of encryption characters; and
encrypting a portion of the plaintext string between the first and last sentinel characters using the set of encryption characters; and
pass through the trailing character(s) following the last sentinel character.

In one embodiment, a system is disclosed. The system comprising:
a processor; and
a memory to store instructions that, when executed by the processor, cause the processor to:
parse a plaintext string undergoing Precision-Preserving Format-Preserving Encryption (PPFPE) starting from a beginning to an end to detect a first sentinel character, wherein a character(s) preceding the first sentinel character comprises a leading character(s);
parse the plaintext string undergoing the PPFPE starting from the end to the beginning to detect a last sentinel character wherein a character(s) following the last sentinel character comprises a trailing character(s);
pass through the leading character(s) preceding the first sentinel character;
generate a ciphertext string by:
encrypting the first and last sentinel characters using one or more subsets of a set of encryption characters; and
encrypting a portion of the plaintext string between the first and last sentinel characters using the set of encryption characters; and
pass through the trailing character(s) following the last sentinel character.

Aspects of any one or more of the foregoing embodiments include detecting a special character, wherein the special character has associated special character encryption rules.

Aspects of any one or more of the foregoing embodiments include wherein the special character comprises a decimal point.

Aspects of any one or more of the foregoing embodiments include wherein the leading character(s) comprises a "0".

Aspects of any one or more of the foregoing embodiments include wherein the leading character(s) comprises a space.

Aspects of any one or more of the foregoing embodiments include wherein the trailing character(s) comprises a "0".

Aspects of any one or more of the foregoing embodiments include wherein the trailing character(s) comprises a space.

Aspects of any one or more of the foregoing embodiments include wherein a subset of the set of encryption characters comprises non-zero characters.

Aspects of any one or more of the foregoing embodiments include wherein a subset of the set of encryption characters comprises non-space printable characters.

FIG. 1 is a block diagram illustrating elements of an example computing environment 100 in which embodiments of the present disclosure may be implemented. More specifically, this example illustrates a computing environment 100 that may function as the servers, user computers, or other systems provided and described herein. The environment 100 includes one or more user computers, or computing devices, such as a computer 104, a communication device 108, and/or more devices 112. The devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These devices 104, 108, 112 may also have any of a variety of applications, including for example, database client and/or server applications, and web browser applications. Alternatively, the devices 104, 108, 112 may be any other electronic device, such as a thin-client computer, Internet-enabled mobile telephone, and/or personal digital assistant, capable of communicating via a network 110 and/or playing audio, displaying images, etc. Although the example computer environment 100 is shown with two devices, any number of user computers or computing devices may be supported.

Environment 100 further includes a network 110. The network 110 can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. For example, the servers 114 and 116 may comprise build servers, which may be used to perform Precision-Preserving Format-Preserving Encryption (PPFPE). The servers 114 and 116 can be running an operating system including any of those discussed above, as well as any commercially available server operating systems. The servers 114 and 116 may also include one or more file and/or application servers, which can, in addition to an operating system, include one or more applications accessible by a client running on one or more of the devices 104, 108, 112. The server(s) 114 and/or 116 may be one or more general purpose computers capable of executing programs or scripts in response to the computers 104, 108, 112. As one example, the servers 114 and 116, may perform Precision-Preserving Format-Preserving encryption and decryption. The server(s) 114 and 116 may also include database servers, including without limitation those commercially available from Oracle®, Microsoft®, Sybase®, IBM® and the like, which can process requests from database clients running on the device 104, 108, 112.

Although for ease of description, FIG. 1 illustrates two servers 114 and 116, those skilled in the art will recognize that the functions described with respect to servers 114, 116 may be performed by a single server and/or a plurality of specialized servers, depending on implementation-specific needs and parameters. The computer systems 104, 108, 112, and servers 114, 116 may function as the system, devices, or components described herein.

The environment 100 may also include a database 118. The database 118 may reside in a variety of locations. By way of example, database 118 may reside on a storage medium local to (and/or resident in) one or more of the computers/servers 104, 108, 112, 114, 116. Alternatively, it may be remote from any or all of the computers/servers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers/servers 104, 108, 112, 114, 116 may be stored locally on the respective computer/server and/or remotely, as appropriate. The database 118 may be used to store encrypted data, decryption keys, etc.

Figure 2:
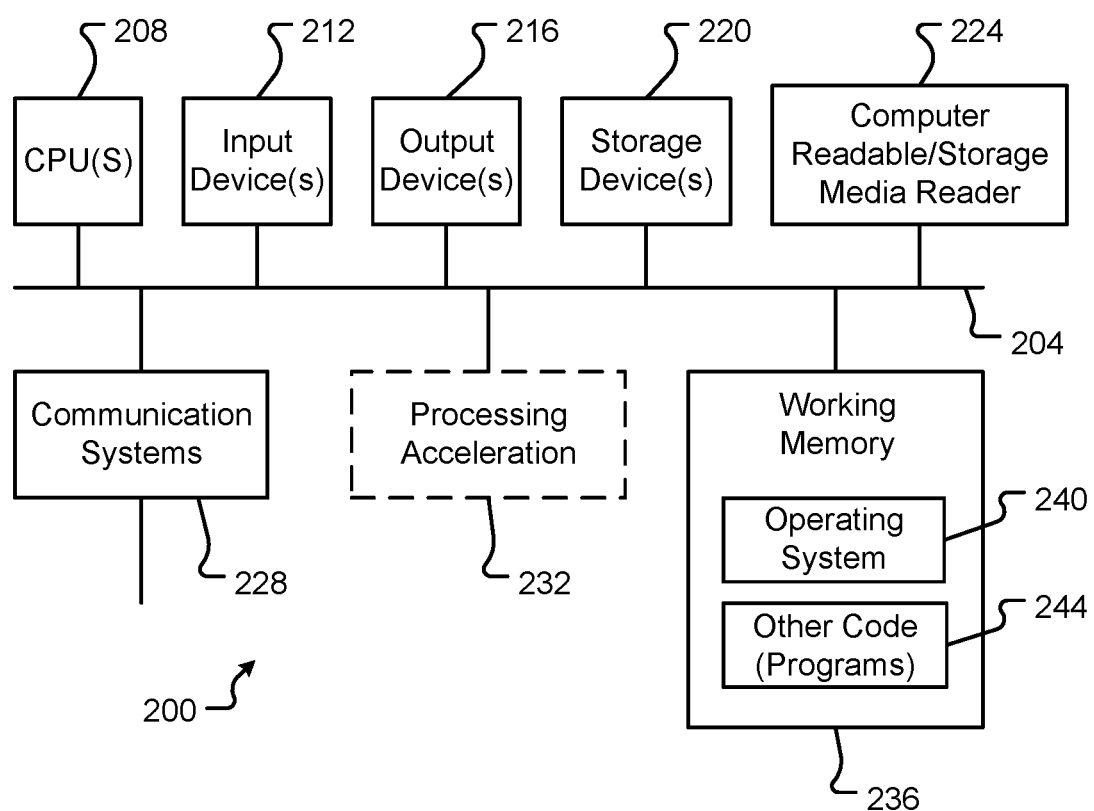
FIG. 2 is a block diagram illustrating elements of an example computing system in which embodiments of the present disclosure may be implemented.

FIG. 2 is a block diagram illustrating elements of an example computing system 200 in which embodiments of the present disclosure may be implemented. More specifically, this example illustrates one embodiment of a computer system 200 upon which the servers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computers such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
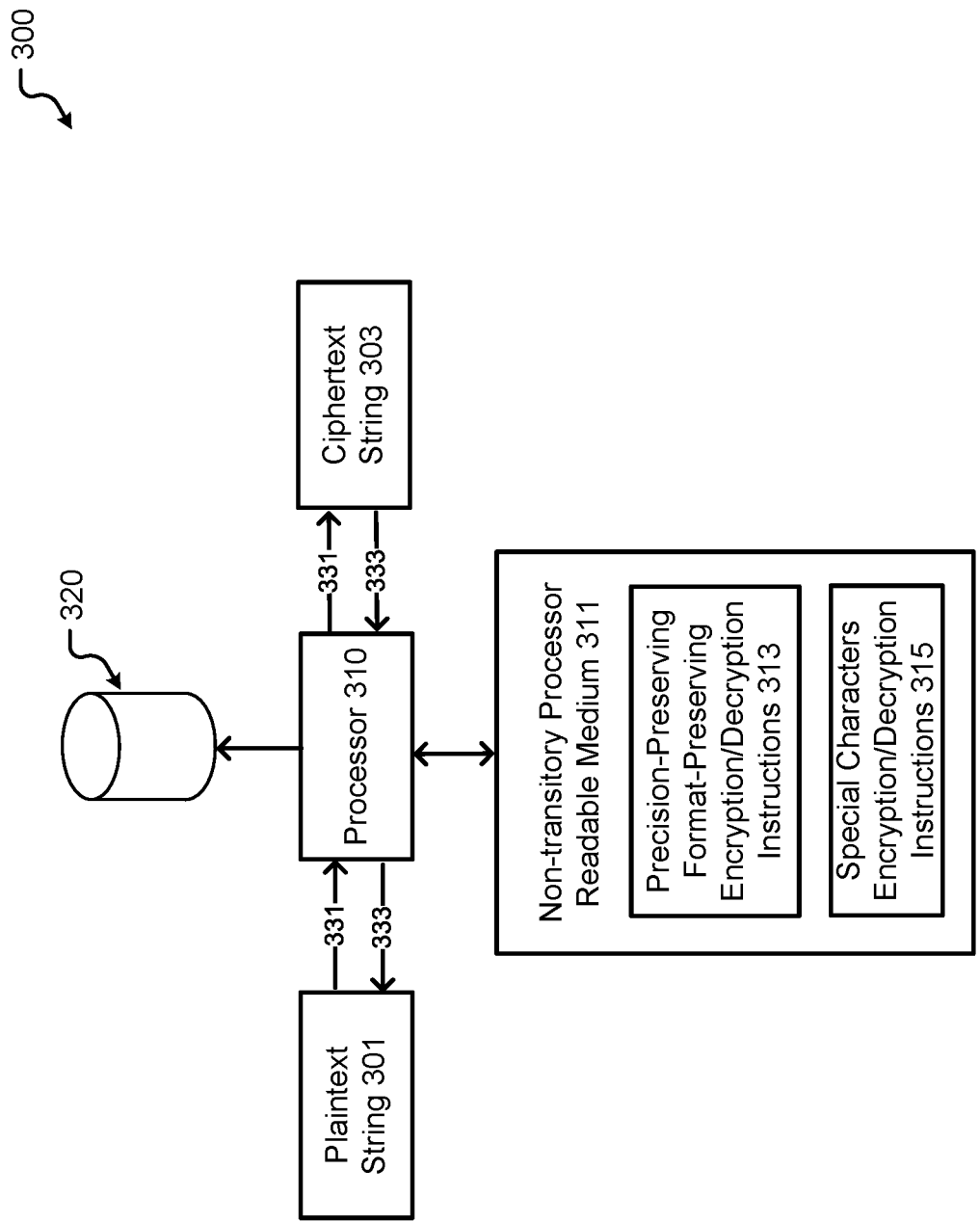
FIG. 3 depicts another example of a computing system in which embodiments of the present disclosure may be implemented.

FIG. 3 depicts an example of a system 300 that may utilize the Precision-Preserving Format-Preserving Encryption (PPFPE) techniques described herein. System 300 may include a processor 310, a non-transitory processor readable medium 311 containing processor executable instructions thereon, and a data store 320. The processor 310 may be any type of device that is capable of executing instructions in order to implement the techniques described herein. For example, the processor 310 may be a central processing unit (CPU), a graphics processing unit (GPU), an application specific integrated circuit (ASIC) or any other device capable of executing instructions stored on a processor readable medium.

The non-transitory processor readable medium 311 may include a set of processor executable instructions thereon. These instructions may be executed by the processor to implement the techniques described herein. For example, the medium may include Precision-Preserving Format-Preserving Encryption/Decryption instructions 313 to retain format and precision when encrypting/decrypting a data item. The operation of encryption/decryption instructions 313 are described below and in the flow diagram depicted in FIG. 5. Arrow 331 illustrated a process for protecting a plaintext string 301 into a ciphertext string 303. Arrow 333 illustrates the (reverse) process of decrypting the ciphertext string 303 back to the plaintext string 301.

The non-transitory medium 311 may also include special character encryption/decryption instructions 315. The special character encryption/decryption instructions 315 may be invoked with special characters (e.g., space(s), "!" exclamation point, "#" pound/hashtag, "&" ampersand, decimal point, etc.) are detected. A special character may be passed through and/or have special character encryption/decryption instructions based on which special character is detected and/or the position of the special character in the plaintext string. The techniques described herein are not dependent on any particular type of FPE algorithm. For purposes of the reminder of this description FPE will refer to any form of Format-Preserving Encryption/Decryption that is readily available.

The system 300 may also include a data store 320. The particular form of the data store 320 is relatively unimportant. The data store 320 may be a relational database, and object database, a key-value store, or any other mechanism for data storage. What should be understood is that any device capable of storing data that has been encrypted using the PPFPE techniques described herein is suitable for use with system 300.

Furthermore, it should be understood that the example implementation of system 300 as processor based is just an example. The techniques described herein are not limited to processor-based systems that execute instructions. The techniques described herein are equally applicable to systems created using discrete logic and hard coded circuitry. For example, the logic may be embodied in the form of an application specific integrated circuit (ASIC), as a field programmable gate array (FPGA), a programmable logic device (PLD), or any other form of logic circuitry.

Figure 4A:
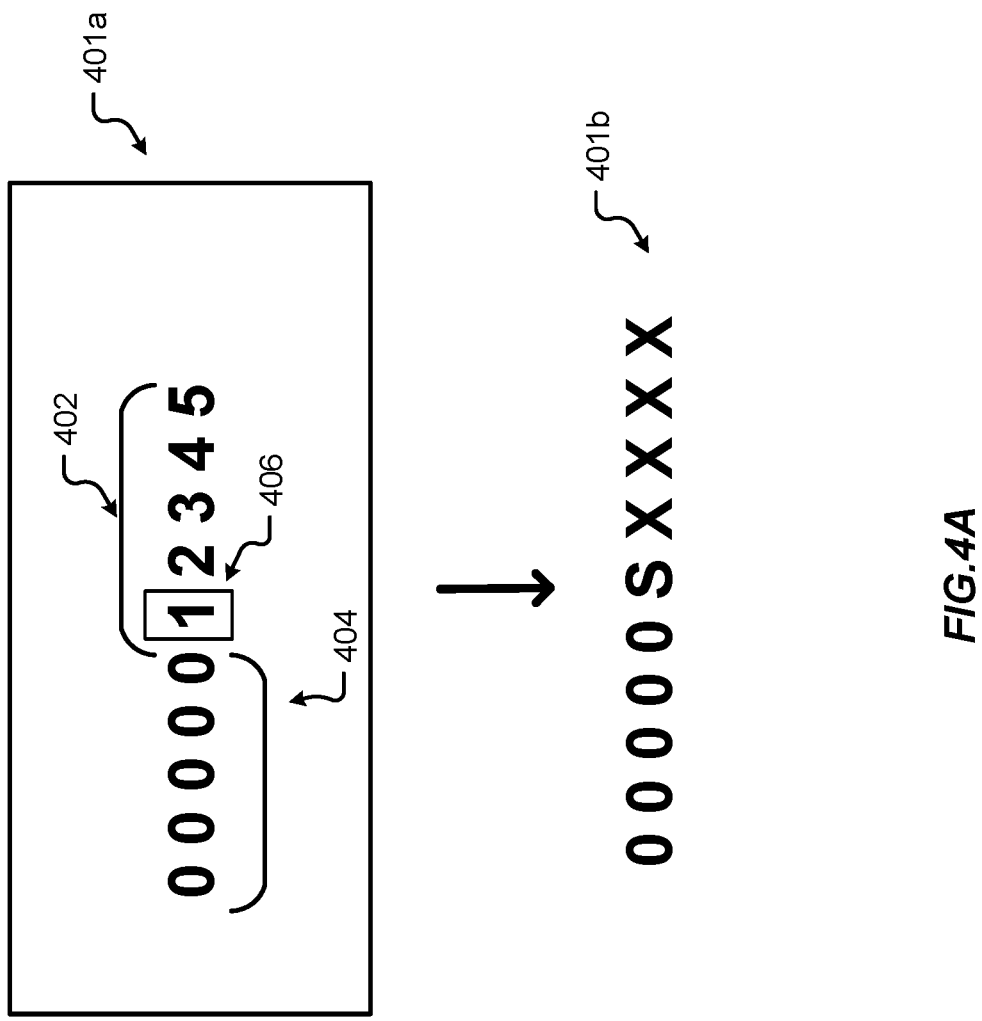

Referring now to FIGS. 4A-I:

FIG. 4A illustrates an embodiment of the Precision-Preserving Format-Preserving Encryption (PPFPE) with no special character in accordance with the present disclosure. A plaintext string 401a (e.g., "0000012345") comprises significant character portion 402, leading characters portion 404, and a first sentinel character 406. Using the method disclosed herein, the plaintext string 401a will protect to the ciphertext string 401b (e.g., "00000SXXXX"), where the first sentinel character 406 ("S") is encrypted using a subset of a set of encryption characters, and "X" is encrypted using the full set of encryption characters (e.g., any digit, including zeroes). In another example, the plaintext string "12000000" would protect to the ciphertext string "SXXXXXXX".

Figure 4B:
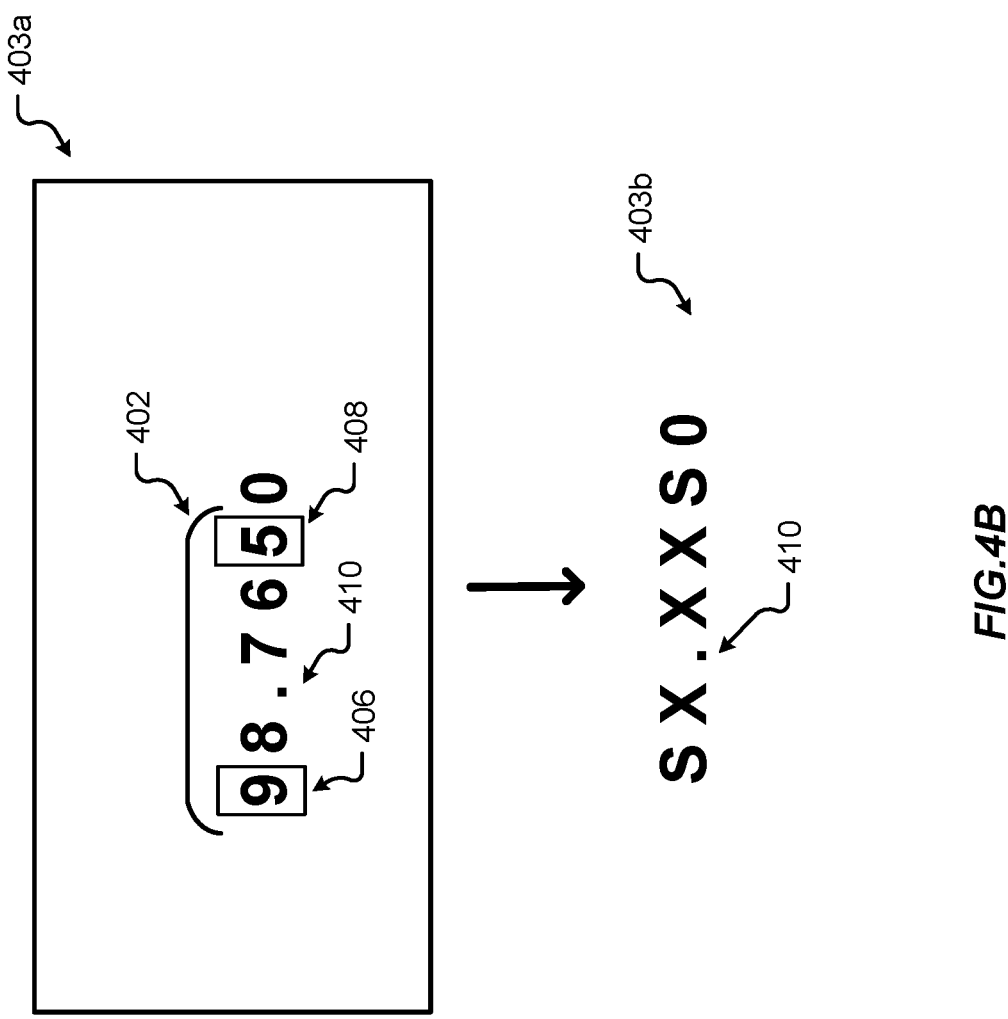

FIG. 4B illustrates another embodiment of the PPFPE with a special character in accordance with the present disclosure. A plaintext string 403a (e.g., "98.7650") comprises significant character portion 402 ("98.765"), a first sentinel character 406 ("9"), a last sentinel character 408 ("5"), and a special character 410 (decimal point). Using the method disclosed herein, the plaintext string 403a will protect to the ciphertext string 403b (e.g., "SX.XXS0"), where the first sentinel character 406/last sentinel character 408 ("S") are encrypted using a subset of a set of encryption characters, and "X" is encrypted using the full set of encryption character (e.g., any digit, including zeroes). The special character 410 (decimal point) is passed through, although other special character processing rules may be used. In this case, "98.7650" and "98.765" are numerically equivalent.

Figure 4C:
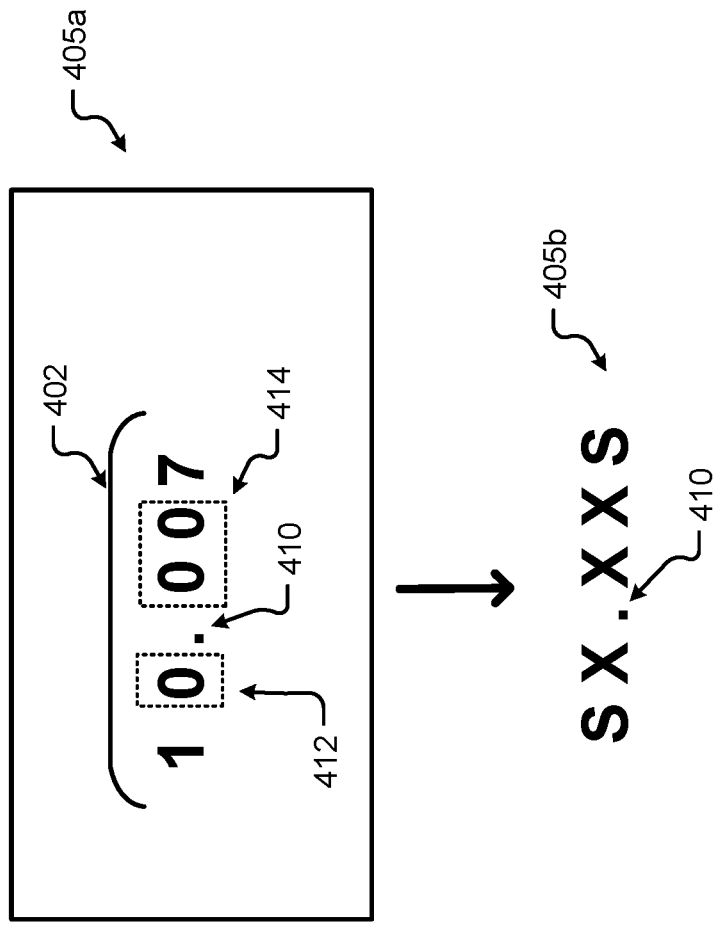

FIG. 4C illustrates a third embodiment of the PPFPE in accordance with the present disclosure. A plaintext string 405a (e.g., "10.007") comprises significant character portion 402 ("10.007"), a first sentinel character ("1"), a last sentinel character ("7"), a special character 410 (decimal point), "trailing" zero 412 before the special character 410, and "leading" zeros 414 after the special character 410. Using the method disclosed herein, the plaintext string 405a will protect to the ciphertext string 405b (e.g., "SX.XXS"), where the first sentinel character 406/last sentinel character 408 ("S") are encrypted using a subset of a set of encryption characters, and "X" is encrypted using the full set of encryption character (e.g., any digit, including zeroes). The special character 410 is passed through, although other special character processing rules may be used.

FIG. 4D illustrates another embodiment of the PPFPE in accordance with the present disclosure. A plaintext string 407a (e.g., "1.007") comprises significant character portion 402 ("1.007"), a first sentinel character 406 ("1"), a last sentinel character 408 ("7"), a special character 410 (decimal point), and "leading" zeros 414 after the special character 410. Using the method disclosed herein, the plaintext string 407a will protect to the ciphertext string 407b (e.g., "S.XXS"), where the first sentinel character 406/last sentinel character 408 ("S") are encrypted using a subset of a set of encryption characters, and "X" is encrypted using the full set of encryption character (e.g., any digit, including zeroes). The special character 410 (decimal point) is passed through, although other special character processing rules may be used.

Figure 4E:
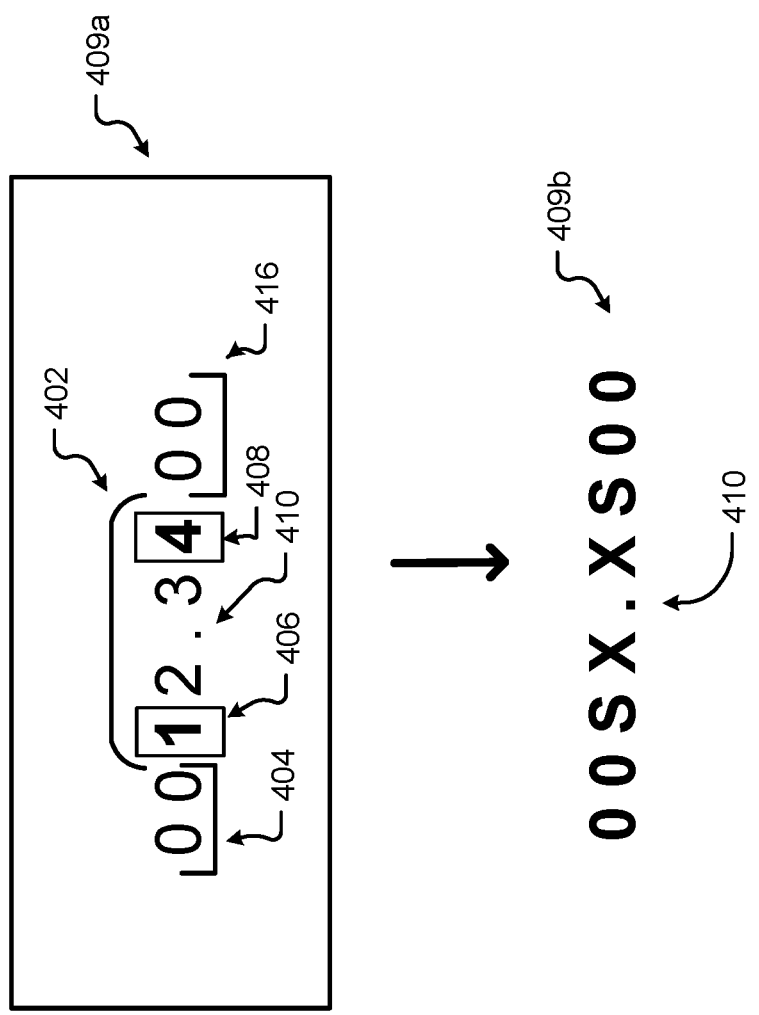

FIG. 4E illustrates another embodiment of the PPFPE in accordance with the present disclosure. A plaintext string 409a (e.g., "0012.3400") comprises significant character portion 402 ("12.34"), a first sentinel character 406 ("1"), a last sentinel character 408 ("4"), a special character 410 (decimal point), leading zeros 404, and trailing zeros 416. Using the method disclosed herein, the plaintext string 409a will protect to the ciphertext string 409b (e.g., "00SX.XS00"), where the first sentinel character 406/last sentinel character 408 ("S") are encrypted using a subset of a set of encryption characters, and "X" is encrypted using the full set of encryption character (e.g., any digit, including zeroes). The leading zeros 404/trailing zeros 416 are passed through without encryption. The special character 410 is passed through, although other special character processing rules may be used.

Figure 4F:
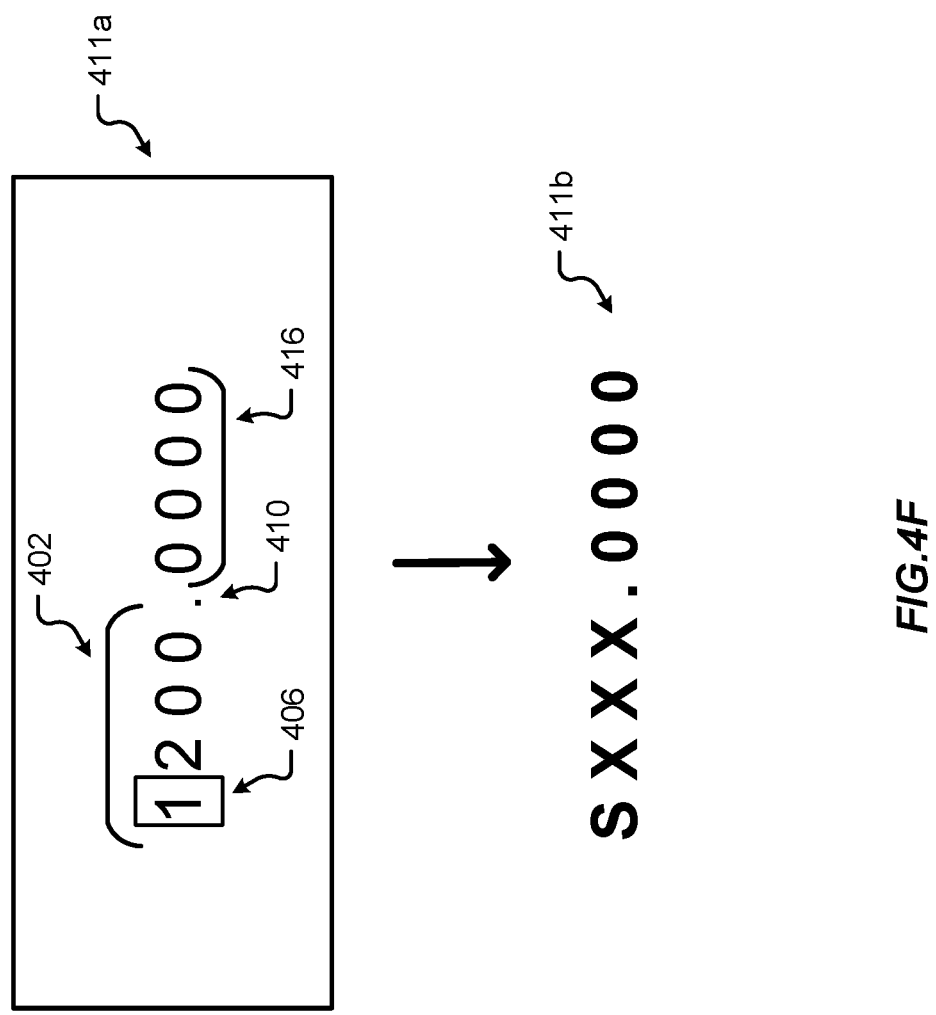

FIG. 4F illustrates another embodiment of the PPFPE in accordance with the present disclosure. A plaintext string 411a (e.g., "1200.0000") comprises significant character portion 402 ("1200."), a first sentinel character 406 ("1"), a special character 410 (decimal point), and trailing zeros 416. Using the method disclosed herein, the plaintext string 411a will protect to the ciphertext string 411b (e.g., "SXXX.0000"), where the first sentinel character 406 ("S") is encrypted using a subset of a set of encryption characters, and "X" is encrypted using the full set of encryption character (e.g., any digit, including zeroes). In this example, the last sentinel character 408 is the same as the special character 410. The trailing zeros 412 and the special character 410 are passed through without encryption. In another example, the plaintext string "123.00000" would protect to the ciphertext string "SXX.00000".

Figure 4G:
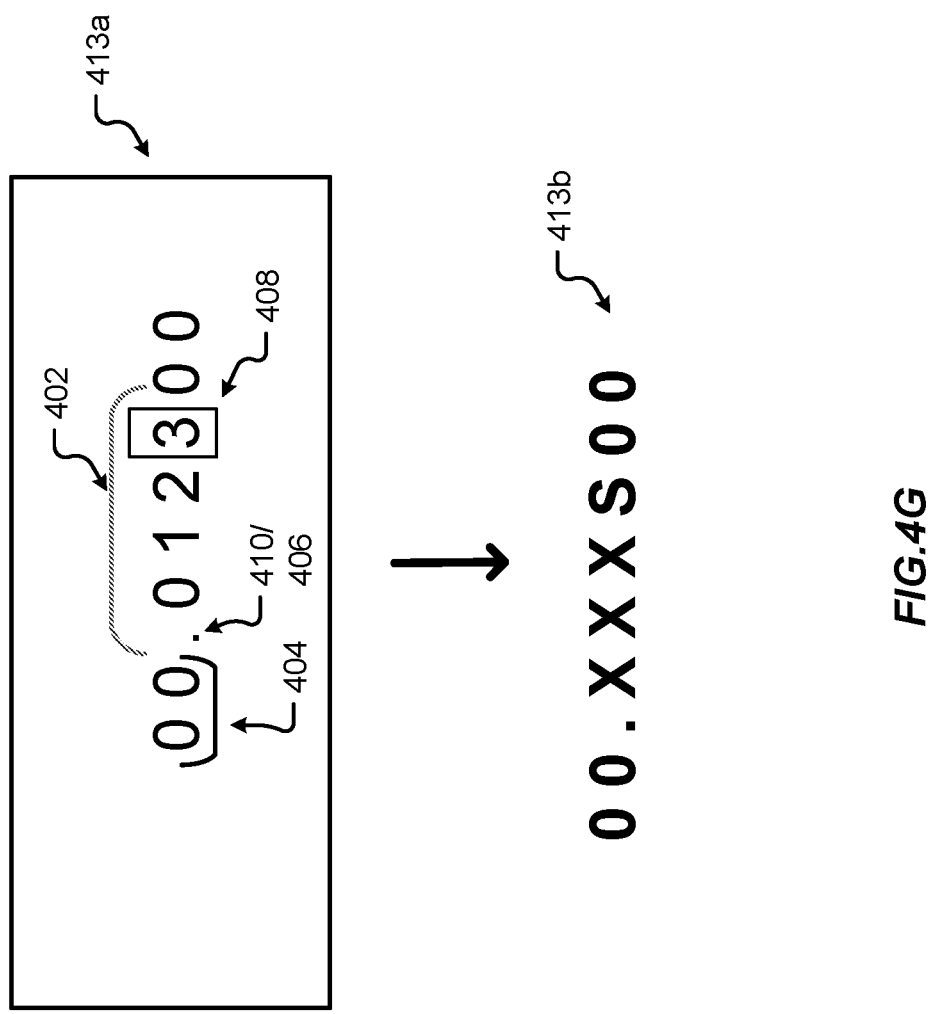

FIG. 4G illustrates another embodiment of the PPFPE in accordance with the present disclosure. A plaintext string 413a (e.g., "00.012300") comprises significant character portion 402 ("0.0123"), a special character 410 (decimal point), which also acts as a first sentinel 406, a last sentinel character 408 ("3"), and leading zeros 404. Using the method disclosed herein, the plaintext string 413a will protect to the ciphertext string 413b (e.g., "00.XXXS00"), where the last sentinel character 408 ("S") is encrypted using a subset of a set of encryption characters, and "X" is encrypted using the full set of encryption character (e.g., any digit, including zeroes). The leading zeros 404 (before the first sentinel character 406/special character 410) and the special character 410 are passed through without encryption. In another example, the plaintext string "0.123450" will protect to the ciphertext string "0.XXXXS0".

Figure 4H:
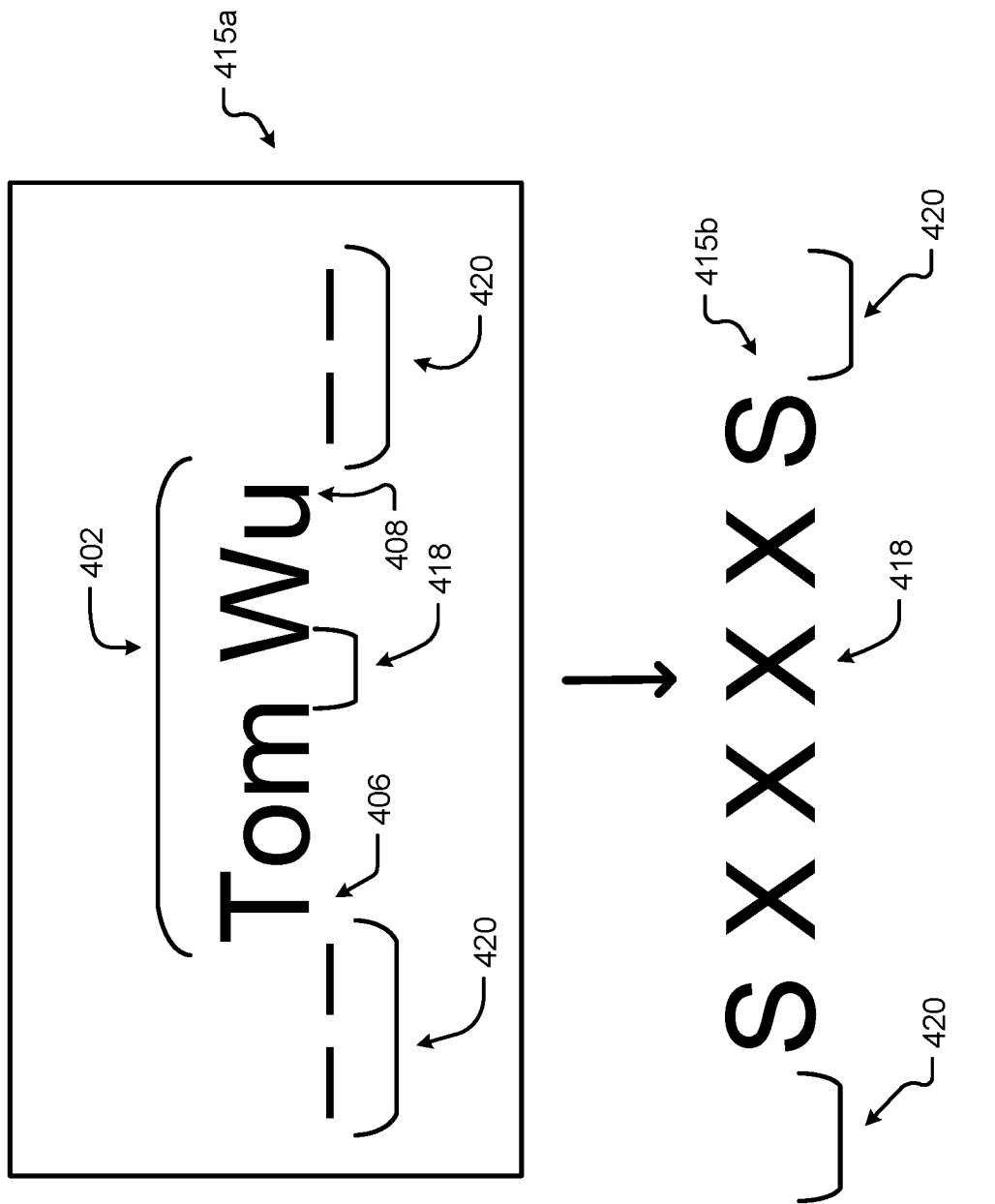

FIG. 4H illustrates another embodiment of the PPFPE in accordance with the present disclosure. A plaintext string 415a (e.g., "_ _Tom_Wu_ _" where there are spaces 420 before the "T" and after the "u") comprises significant character portion 402 ("Tom_Wu"), a first sentinel character 406 ("T"), a last sentinel character 408 ("u"), and interior space 418, separating the first and last names. For illustrative purposes, the significant portion 402 is preceded by leading spaces 420 and followed by trailing spaces 420. For example, if the field is a fixed-length field, leading/trailing spaces may be added so that all records have the same length. Using the method disclosed herein, the plaintext string 415a will protect to the ciphertext string 415b (e.g., "_ _SXXXXS_ _"), where the first sentinel character 406/last sentinel character 408 ("S") are encrypted using a subset of a set of encryption characters (e.g., any non-space printable character), and "X" is encrypted using the full set of encryption character (e.g., any printable character including a space " "). In other words, the leading/trailing spaces 420 may be passed through and the interior space 418 between "Tom" and "Wu" may be protected to X.

Figure 4I:
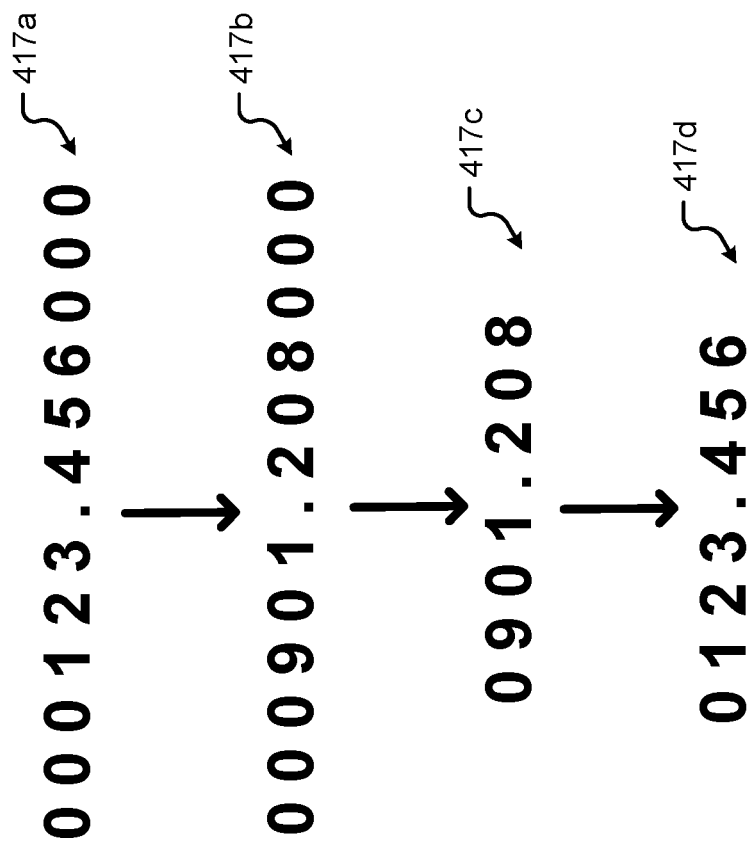

FIG. 4I illustrates an example of how a ciphertext string generated using PPFPE can be modified with respect to the leading/trailing characters while the significant portion of the original plaintext remains recoverable. A plaintext string 417*a* "000123.456000" may protected using PPFPE to a ciphertext string 417*b* "000901.208000". The ciphertext string 417*b* is an example of how plaintext string 417*a* may be protected, other ciphertext strings may be generated using the methods disclosed herein. The ciphertext string 417*b* may be modified to the modified ciphertext string 417*c* "0901.208". When the modified ciphertext string 417*c* is decrypted, the original precision is maintained (e.g., decrypted ciphertext string 417*d* "0123.456").

To summarize FIGS. 4A-I

In the process of parsing the plaintext string, either from the first character to the last or from the last character to the first character, a special character may be detected (block 518). Special characters require special character processing rules (block 520). For example, special characters may be passed through as well. Special characters such as decimal points may change the rules for leading/trailing zeros. If any special characters are detected (Yes), in block 518, any detected special characters are encrypted using special character encrypting instructions. For example, in the plaintext string "0012.3400" the decimal point is a special character, which has associated special character processing instructions. In this example, the special character (decimal point) is passed through without encryption.

In block 512, the ciphertext string is generated. Generating the ciphertext string may comprise encrypting the first (e.g., "1") and last (e.g., "4") sentinel character(s) using one or more subsets of a set of encryption characters (e.g., 1-9); and encrypting a portion of the plaintext string between the first and last sentinel character(s) (e.g., "234") using the full

|          | Plaintext      |    | Ciphertext     |    | Plaintext |
|----------|----------------|----|----------------|----|-----------|
| FIG. 4A  | 0 0 0 0 0 1 2 3 4 5 | → | 0 0 0 0 0 S X X X X | |           |
| FIG. 4B  | 9 8 . 7 6 5 0  | → | S X . X X S 0  |    |           |
| FIG. 4C  | 1 0 . 0 0 7    | → | S X . X X S    |    |           |
| FIG. 4D  | 1 . 0 0 7      | → | S . X X S      |    |           |
| FIG. 4E  | 0 0 1 2 . 3 4 0 0 | → | 0 0 S X . X S 0 0 | |           |
| FIG. 4F  | 1 2 0 0 . 0 0 0 0 | → | S X X X . 0 0 0 0 | |           |
| FIG. 4G  | 0 0 . 0 1 2 3 0 0 | → | 0 0 . X X X S 0 0 | |           |
| FIG. 4H  | _ _ T o m _ W u _ _ | → | _ _ S X X X X S _ _ | |         |
| FIG. 4I  | 000123.456000  | → | 0901.208       | →  | 0123.456  |

Figure 5:
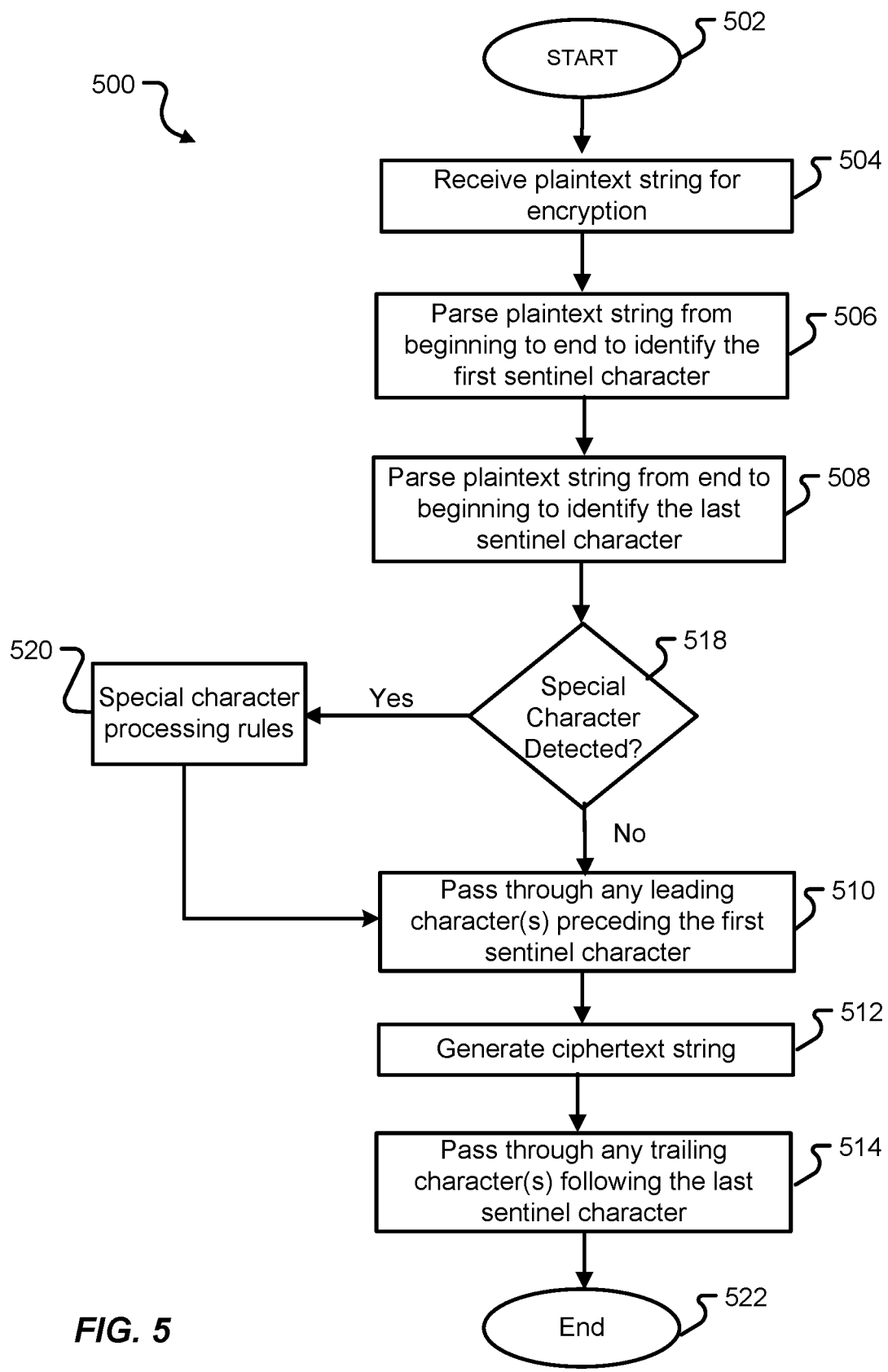
FIG. 5 depicts an example of a high-level flow diagram for Precision-Preserving Format-Preserving Encryption (PPFPE) and special character handling according to the techniques described herein.

FIG. 5 depicts an example of a high-level flow diagram for a process 500 of Precision-Preserving Format-Preserving Encryption (PPFPE) on a data element (e.g., a plaintext string) according to the techniques described herein. As one of skill in the art would recognize, there may be various ways to implement the process 500 for PPFPE.

While a general order for the steps of the process 500 for the operation of Precision-Preserving Format-Preserving encryption/decryption shown in FIG. 5, the process 500 can include more or fewer steps or can arrange the order of the steps differently than those shown in FIG. 5. Further, two or more steps may be combined into one step. Generally, the process 500 starts with a START operation 502 and ends with an END operation 522.

In block 504, a plaintext string undergoing the PPFPE is received. In block 506, the plaintext string is parsed starting from a beginning (e.g., first character) to an end (e.g., last character) to detect a first sentinel character, wherein a character(s) preceding the first sentinel character comprises a leading character(s). For example, for the plaintext string input "0012.34000" the first sentinel character is the first non-zero character or in this example, "1" and the characters "00" comprising leading characters (e.g., leading zeros).

In block 508, the plaintext string is parsed starting from the end (e.g., last character) to the beginning (e.g., first character) to detect a last sentinel character, wherein a character(s) following the last sentinel character comprises a trailing character(s). Continuing the example discussed above, the last sentinel character would be "4" and "000" would be trailing characters (e.g., trailing zeros). In block 518, if no special characters are detected (No), process 500 continues to block 510. In block 510, any detected leading character(s) (e.g., "00") are passed through without encryption.

set of encryption characters (e.g., 0-9). In block 514 any special/trailing characters are passed through.

Figure 6:
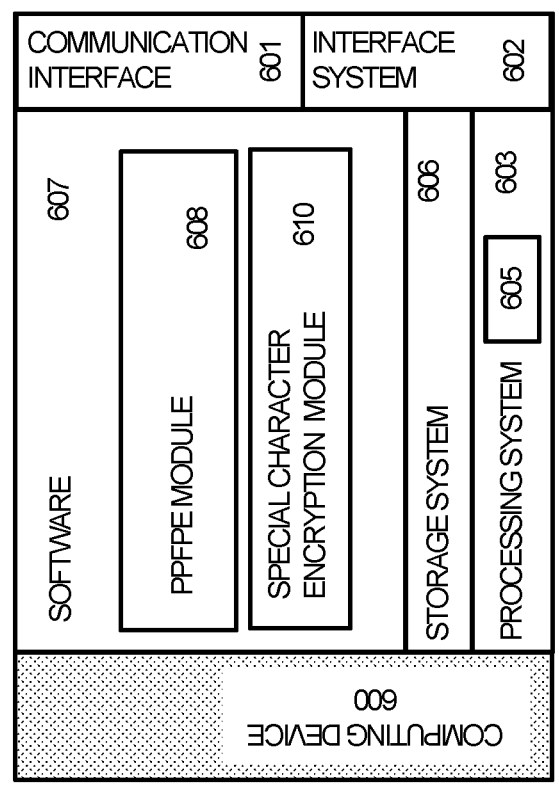
FIG. 6 is a block diagram illustrating an example computing device for the PPFPE and special character handling according to one embodiment of the present disclosure.

FIG. 6 depicts a computing device 600 in accordance with embodiments of the present disclosure. The computing device 600 performs the Precision-Preserving Format-Preserving Encryption (PPFPE) with special characters in accordance with the embodiments disclosed herein.

In some embodiments, the computing device 600 may store the encrypted plaintext string (e.g., ciphertext string) in the storage system 606 and display the plaintext/ciphertext string via the user interface system 602 (e.g., display and/or a speaker or headphones connected to computing device 600). Similar computing systems may be included in devices 104, 108, 112, 200, and 310 in whole or in part, described herein to perform the PPFPE with special characters.

A computing system 600 is representative of any computing system or systems with which the various operational architectures, processes, scenarios, and sequences disclosed herein to perform the format-preserving encryption with precision and special characters comprising various components and connections to other components and/or systems.

The computing system 600 comprises a communication interface 601, a user interface system 602, and a processing system 603. The processing system 603 is linked to the communication interface 601 and user interface system 602. The processing system 603 includes a microprocessor and/or processing circuitry 605 and a storage system 606 that stores operating software 607. The computing system 600 may include other well-known components such as a battery and enclosure that are not shown for clarity. The computing system 600 may comprise a server, a user device, a desktop computer, a laptop computer, a tablet computing device, or some other user communication apparatus.

The communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, the communication interface 601 is configured to communicate with other devices, wherein the communication interface 601 is used to receive a plaintext string for encryption and transmit a decrypted ciphertext string.

The user interface system 602 comprises components that interact with a user. The user interface system 602 may include a speaker, microphone, buttons, lights, display screen, touch screen, touch pad, scroll wheel, communication port, or some other user input/output apparatus—including combinations thereof.

The processing circuitry 605 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via a bus, executes instructions, and outputs data, again such as via the bus. In other embodiments, the processing circuitry 605 may comprise a shared processing device that may be utilized by other processes and/or process owners, such as in a processing array or distributed processing system (e.g., "cloud," farm, etc.). It should be appreciated that the processing circuitry 605 is a non-transitory computing device (e.g., electronic machine comprising circuitry and connections to communicate with other components and devices). The processing circuitry 605 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor and the hardware and other circuitry thereof.

The processing circuitry 605 comprises a microprocessor and other circuitry that retrieves and executes the operating software 607 from the storage system 606. The storage system 606 may include volatile and nonvolatile, removable, and non-removable media implemented in any method or technology for storage of information, such as computer readable instructions, data structures, program modules, or other data. The storage system 606 may be implemented as a single storage device, but may also be implemented across multiple storage devices or sub-systems. The storage system 606 may comprise additional elements, such as a controller to read the operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

The processing circuitry 605 is typically mounted on a circuit board that may also hold the storage system 606 and portions of the communication interface 601 and the user interface 602. The operating software 607 comprises computer programs, firmware, or some other form of machine-readable program instructions. The operating software 607 includes format-preserving encryption module 608 and special character encryption module 610, although any number of software modules within the application may provide the same operation. The operating software 607 may further include an operating system, utilities, drivers, network interfaces, applications, or some other type of software. When executed by the processing circuitry 605, the operating software 607 directs the processing system 603 to operate the computing device 600 as described herein.

In at least one implementation, the Precision-Preserving Format-Preserving Encryption (PPFPE) module 608, when read and executed by the processing system 603, directs the processing system 603 to process a plaintext string in accordance with the process 500 in FIG. 5. The special character encryption module 610 when read and executed by the processing system 603, directs the processing system 603 to use the special character processing rules to encrypt any special characters found in the plaintext string to be encrypted.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A method for performing Precision-Preserving Format-Preserving Encryption (PPFPE), the method comprising:
   parsing a plaintext string comprising a plurality of characters undergoing the PPFPE starting from a beginning character of the plaintext string to an end character of the plaintext string to detect a first sentinel character, wherein a character preceding the first sentinel character comprises a leading character;
   parsing the plaintext string undergoing the PPFPE starting from the end character to the beginning character to detect a last sentinel character, wherein a character following the last sentinel character comprises a trailing character;
   passing through any leading character(s) preceding the first sentinel character;
   generating a ciphertext string by:
      encrypting the first sentinel character and the last sentinel character using a subset of a full set of encryption characters, wherein the full set of encryption characters includes a character corresponding to the leading character or trailing character, and wherein the subset excludes the character corresponding to the leading character or the trailing character; and
      encrypting a portion of the plaintext string between the first sentinel character and the last sentinel character using the full set of encryption characters;
   passing through any trailing character(s) following the last sentinel character; and
   storing the generated ciphertext string.

2. The method of claim 1, further comprising:
   detecting a special character, wherein the special character is in any position of the plaintext string, and wherein the special character is passed through without encryption.

3. The method of claim 2, wherein the special character comprises a decimal point.

4. The method of claim 1, wherein the leading character comprises a "0".

5. The method of claim 1, wherein the leading character comprises a space.

6. The method of claim 1, wherein the trailing character comprises a "0".

7. The method of claim 1, wherein the trailing character comprises a space.

8. The method of claim 1, wherein the subset of the full set of encryption characters comprises non-zero characters.

9. The method of claim 1, wherein the subset of the full set of encryption characters comprises non-space printable characters.

10. A non-transitory processor readable medium containing a set of instructions thereon that, when executed by a processor, cause the processor to:
   parse a plaintext string comprising a plurality of characters undergoing Precision-Preserving Format-Preserving Encryption (PPFPE) starting from a beginning character of the plaintext string to an end character of the plaintext string to detect a first sentinel character, wherein a character preceding the first sentinel character comprises a leading character;
   parse the plaintext string undergoing the PPFPE starting from the end character to the beginning character to detect a last sentinel character, wherein a character following the last sentinel character comprises a trailing character;
   pass through the leading character preceding the first sentinel character;
   generate a ciphertext string by:
      encrypting the first sentinel character and the last sentinel character using a subset of a full set of encryption characters, wherein the full set of encryption characters includes a character corresponding to the leading character or trailing character, and wherein the subset excludes the character corresponding to the leading character or the trailing character; and
      encrypting a portion of the plaintext string between the first sentinel character and the last sentinel character using the full set of encryption characters;
   pass through the trailing character following the last sentinel character; and
   store the generated ciphertext string.

11. The non-transitory processor readable medium of claim 10, further comprising instructions that, when executed by the processor, cause the processor to:
   detect a special character, wherein the special character is in any position of the plaintext string, and wherein the special character is passed through without encryption.

12. The non-transitory processor readable medium of claim 11, wherein the special character comprises a decimal point.

13. The non-transitory processor readable medium of claim 10, wherein the leading character comprises a "0".

14. The non-transitory processor readable medium of claim 10, wherein the leading character comprises a space.

15. The non-transitory processor readable medium of claim 10, wherein the trailing character comprises a "0".

16. The non-transitory processor readable medium of claim 10, wherein the trailing character comprises a space.

17. The non-transitory processor readable medium of claim 10, wherein the subset of the full set of encryption characters comprises non-zero characters.

18. The non-transitory processor readable medium of claim 10, wherein the subset of the full set of encryption characters comprises non-space printable characters.

19. A system comprising:
   a processor; and
   a memory to store instructions that, when executed by the processor, cause the processor to:
      parse a plaintext string comprising a plurality of characters undergoing Precision-Preserving Format-Preserving Encryption (PPFPE) starting from a beginning character of the plaintext string to an end character of the plaintext string to detect a first sentinel character, wherein a character preceding the first sentinel character comprises a leading character;
      parse the plaintext string undergoing the PPFPE starting from the end character to the beginning character to detect a last sentinel character, wherein a character following the last sentinel character comprises a trailing character;
      pass through the leading character preceding the first sentinel character;
      generate a ciphertext string by:
         encrypting the first sentinel character and the last sentinel character using a subset of a full set of encryption characters, wherein the full set of encryption characters includes a character corresponding to the leading character or trailing character, and wherein the subset excludes the character corresponding to the leading character or the trailing character; and encrypting a portion of the plaintext string between the first sentinel character and the last sentinel character using the full set of encryption characters;

pass through the trailing character following the last sentinel character; and store, in the memory, the generated ciphertext string.

20. The system of claim 19, further comprising instructions that, when executed by the processor, cause the processor to:

detect a special character, wherein the special character is in any position of the plaintext string, and wherein the special character is passed through without encryption.

* * * * *